United States Patent
Lindoff et al.

(10) Patent No.: US 10,757,646 B2
(45) Date of Patent: *Aug. 25, 2020

(54) MEASURING IN A MOBILE COMMUNICATIONS TERMINAL

(71) Applicant: Telefonaktiebolaget LM Ericsson (publ), Stockholm (SE)

(72) Inventors: Bengt Lindoff, Bjarred (SE); Harald Gustafsson, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,728

(22) Filed: Feb. 29, 2020

(65) Prior Publication Data

US 2020/0205066 A1  Jun. 25, 2020

Related U.S. Application Data

(63) Continuation of application No. 16/601,700, filed on Oct. 15, 2019, now Pat. No. 10,609,637, which is a continuation of application No. 16/279,647, filed on Feb. 19, 2019, now Pat. No. 10,492,135, which is a continuation of application No. 14/898,467, filed as application No. PCT/EP2014/062583 on Jun. 16, 2014, now Pat. No. 10,231,175.

(30) Foreign Application Priority Data

Jun. 20, 2013  (EP) .................................. 13172941

(51) Int. Cl.
*H04W 48/18* (2009.01)
*H04Q 9/00* (2006.01)
*H04W 48/16* (2009.01)

(52) U.S. Cl.
CPC .............. *H04W 48/18* (2013.01); *H04Q 9/00* (2013.01); *H04W 48/16* (2013.01); *H04Q 2209/43* (2013.01); *H04Q 2209/47* (2013.01)

(58) Field of Classification Search
CPC ... H04W 88/06; H04W 84/12; H04W 84/042; H04B 17/104; H04B 1/3827; H04L 25/0264
See application file for complete search history.

(56) References Cited

U.S. PATENT DOCUMENTS 10,231,175 B2    3/2019  Lindoff et al.
10,492,135 B2 *  11/2019 Lindoff .................... H04Q 9/00
(Continued)

FOREIGN PATENT DOCUMENTS

CN    102034342 A    4/2011
CN    102934467 A    2/2013
(Continued)

OTHER PUBLICATIONS

PCT International Search Report, dated Jul. 28, 2014, in connection with International Application No. PCT/EP2014/062583, all pages.
(Continued)

*Primary Examiner* — Joseph E Dean, Jr.
(74) *Attorney, Agent, or Firm* — Leffler Intellectual Property Law, PLLC

(57) ABSTRACT

A User Equipment having at least one sensor, a short range communications interface, a long range communications interface and a controller, wherein the controller is configured for: establishing a connection with a first access point through the short range communications interface; receiving operating instructions for the at least one sensor from the first access point; causing the at least one sensor to operate according to the operating instructions; receiving sensor data from the at least one sensor; and for reporting the sensor data through the long range communications interface.

18 Claims, 3 Drawing Sheets

(56) References Cited

U.S. PATENT DOCUMENTS

| | | | |
|---|---|---|---|
| 2007/0152815 A1 | 7/2007 | Meyers et al. | |
| 2008/0100706 A1 | 5/2008 | Breed | |
| 2009/0171180 A1 | 7/2009 | Pering et al. | |
| 2009/0245221 A1 | 10/2009 | Piipponen | |
| 2011/0074587 A1 | 3/2011 | Hamm et al. | |
| 2011/0222699 A1 | 9/2011 | Maeda et al. | |
| 2011/0279271 A1* | 11/2011 | Monroe ............ | G06F 19/3468 340/568.1 |
| 2013/0076591 A1 | 3/2013 | Sirpal et al. | |
| 2014/0073302 A1 | 3/2014 | Trethewey et al. | |
| 2014/0098723 A1 | 4/2014 | Battista | |
| 2014/0269628 A1 | 9/2014 | Ghosh et al. | |

FOREIGN PATENT DOCUMENTS

| | | |
|---|---|---|
| EP | 2369748 A1 | 9/2011 |
| EP | 2546673 A2 | 1/2013 |

OTHER PUBLICATIONS

PCT Written Opinion, dated Jul. 28, 2014, in connection with International Application No. PCT/EP2014/062583, all pages.

Chinese Search Report dated Feb. 1, 2018 in connection with Chinese Application No. 2014800350535, 2 pages.

English language translation of Chinese Search Report dated Feb. 1, 2018 in connection with Chinese Application No. 2014800350535, 2 pages.

Ohinese Search Report dated Sep. 11, 2018 in connection with Chinese Application No. 2014800350535, 2 pages.

Non-Final Office Action dated Nov. 18, 2019 in connection with U.S. Appl. No. 16/601,700, 7 pages.

Notice of Allowance dated Feb. 7, 2020 in connection with U.S. Appl. No. 16/601,700, 17 pages.

Non-Final Office Action dated Mar. 22, 2019 in connection with U.S. Appl. No. 16/279,647, 14 pages.

Notice of Allowance dated Aug. 13, 2019 in connection with U.S. Appl. No. 16/279,647, 9 pages.

Non-Final Office Action dated Aug. 3, 2016 in connection with U.S. Appl. No. 14/898,467, 14 pages.

Final Office Action dated Dec. 23, 2016 in connection with U.S. Appl. No. 14/898,467, 11 pages.

Non-Final Office Action dated Apr. 7, 2017 in connection with U.S. Appl. No. 14/898,467, 12 pages.

Final Office Action dated Oct. 13, 2017 in connection with U.S. Appl. No. 14/898,467, 12 pages.

Notice of Allowance dated Jul. 12, 2018 in connection with U.S. Appl. No. 14/898,467, 12 pages.

Notice of Allowance dated Oct. 26, 2018 in connection with U.S. Appl. No. 14/898,467, 13 pages.

* cited by examiner

MEASURING IN A MOBILE COMMUNICATIONS TERMINAL

CROSS-REFERENCE TO RELATED APPLICATIONS

This application claims the benefit of U.S. application Ser. No. 16/601,700, filed Oct. 15, 2019, which claims the benefit of U.S. application Ser. No. 16/279,647 (now U.S. Pat. No. 10,492,135) filed Feb. 19, 2019, which claims the benefit of U.S. application Ser. No. 14/898,467 (now U.S. Pat. No. 10,231,175) filed Dec. 14, 2015 (371(c) date), which is a 35 U.S.C. § 371 national stage of international application PCT/EP2014/062583 filed Jun. 16, 2014, which claims priority under 35 U.S.C. § 119 to European Patent Application No. 13172941.0, filed Jun. 20, 2013. All of these earlier applications are hereby incorporated herein by reference in their entireties.

TECHNICAL FIELD

This application relates to a method, a general sensor and a computer-readable storage medium for improved sensor operation, and in particular to a method, a general sensor and a computer-readable storage medium for improved sensor operation and receiving sensor instructions and reporting sensor data over radio frequency networks.

BACKGROUND

The concept of pre-configured or purpose built sensor devices are common. Also pre-configuration of smartphone sensors in applications is seen today. One example of how such a configuration is performed by downloading an application to a smartphone that is thus configured to register bumps in the road by usage of the accelerometer (for bump detection) and the GPS for geo-location. The sensor data is then reported to road maintainers. This is an example of a pre-configured sensor device, that is configured out-of-context, e.g. during application install at home. Another example of out-of-context configuration is triggering pre-defined events when a known wireless/cellular network is within range or a pre-defined geo-location area is reached. The events and the corresponding operation are predefined and only the detection of the event triggers the execution, but the operation is, as such, defined out-of-context.

The main problem is that a general sensor device can be used for many different purposes and out-of-context instructions will be huge if they should cover all possible contexts. Furthermore, it is not possible to handle new contexts without bringing the device in for an out-of-context update. Another problem is time varying context awareness which is impossible to support through an out-of-context configuration.

For example, assume a general sensor included in a container that needs to be kept cold and being transported by a truck, say. During transportation it might be important to keep track of the goods (GPS) as well as keep track on the temperature with regular intervals. On the other side, once the device comes to a warehouse there is no need for GPS reporting (not so often at least) and it may be a place where the temperature is under control so there might not be a need to perform temperature measurements too often.

In prior art solutions a general sensor may be configured to report a. position and a temperature every minute, what so ever circumstances, draining battery for the sensor. While, in practice, it may suffice with a reporting every hour or so once the sensor is in a warehouse. The general sensor according to the prior art solutions would thus draw an unnecessary amount of power, both for sensing and for reporting the measurements.

Furthermore, the reporting itself may imply costs (roaming etc), and therefore the reporting may incur higher operating costs than actually needed.

Therefore, there is a need for method and apparatus for remote instruction of general sensor device for specific actions requested in a specific context.

SUMMARY

It is a further object of the teachings of this application to overcome the problems listed above by providing a general sensor comprising at least one sensor, a short range communications interface, a long range communications interface and a controller, wherein said controller is configured for: detecting a first access point through said short range communications interface; receiving operating instructions for said at least one sensor from said first access point; causing said at least one sensor to operate according to said operating instructions; receiving sensor data from said at least one sensor; and for reporting said sensor data through said long range communications interface. This enables for an in-context configuration of a general sensor.

In one embodiment the general sensor further configured for: detecting a second access point through said short range communications interface; receiving operating instructions for said at least one sensor from said second access point; and determining whether at least one of said at least one sensors should operate according to said operating instructions, and, if so, causing said least one of said at least one sensor to operate according to said operating instructions.

This enables for a context specific configuration of a general sensor, where configuration and data reporting is performed at no cots for the instruction provider, i.e, the user who configures the general sensor.

In one embodiment the general sensor is incorporated in a mobile communications terminal.

It is a further object of the teachings of this application to overcome the problems listed above by providing a method for use in a general sensor comprising at least one sensor, a short range communications interface, a long range communications interface, said method comprising: detecting a first access point through said short range communications interface; receiving operating instructions for said at least one sensor from said first access point; causing said at least one sensor to operate according to said operating instructions; receiving sensor data from said at least one sensor; and for reporting said sensor data through said long range communications interface.

It is a further object of the teachings of this application to overcome the problems listed above by providing a computer readable medium comprising instructions that when loaded into and executed by a controller, such as a processor, cause the execution of a method according to herein.

The inventors of the present application have realized, after inventive and insightful reasoning, that by enabling a general sensor comprising at least one sensor 130 to receive operating instructions via a short range communication network it is possible to provide the general sensor with operating instructions that are context specific and without any cost to the instructions provider. Especially when providing complicated control scripts the data traffic needed to transmit the necessary code segments may be non-negligent. The installment of an access point does require some fees, but the initial install fee is low compared to the running fees of a cellular subscription. The investment of installing, for example, a WIN access point usually equals one month of a cellular subscription.

The use of short range communication interfaces also ensures a more secure connection as such connections are easier to control and maintain as they fall under the control of the instructions provider. The connection quality is also easier to control and provides for a more reliable connection. Should an access point not be able to provide adequate signal quality through its coverage area, the access point may be moved to increase the signal quality (such as passed a thick wall). Such modifications are much more difficult to accomplish when relying on cellular networks, especially when the cellular service is provided by a service provider that might be unwilling to install a new base station at every location. It is also possible to provide a more specific position locality for providing an accurate space locality context as the access point defines the context-specific location.

The inventors of the present application have furthermore realized, after inventive and insightful reasoning, that by enabling the general sensor to report the data via a cellular network through the cellular communication interface of the general sensor, the data may be reported without incurring any costs to the operating instructions provider. This enables a context specific configuration of a general sensor at no cost to the provider of operating instructions. Should the operating instructions provider be required to bare the cost of data reporting it could lead to more complicated business deals having to be made, and also unwillingness to implement a local access point for providing operating instructions.

Other features and advantages of the disclosed embodiments will appear from the attached detailed disclosure.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
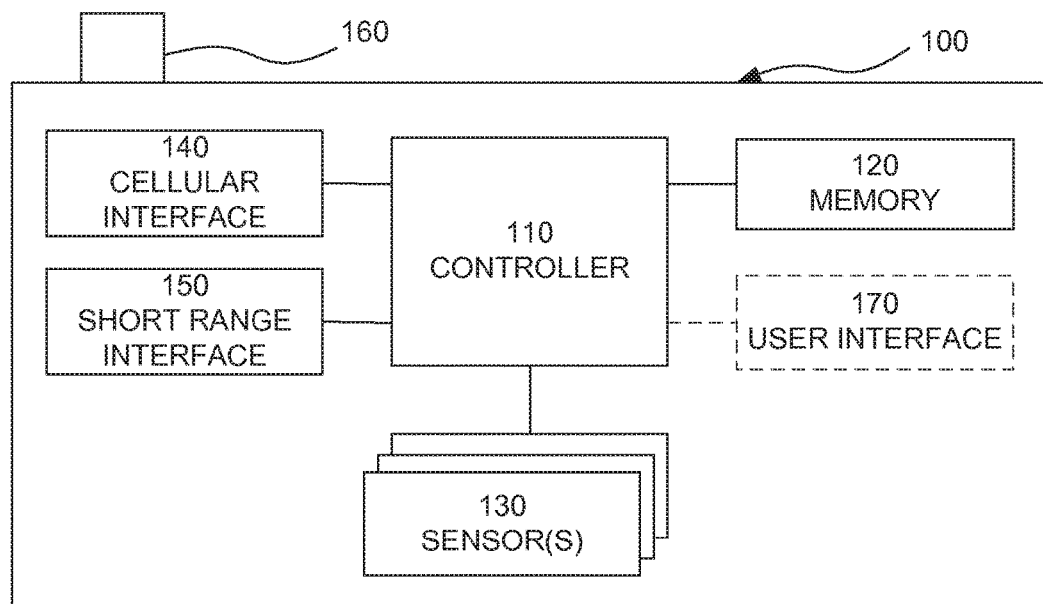
FIG. 1 shows a schematic view of the general structure of a general sensor according to one embodiment of the teachings of this application.

FIG. 1 shows a schematic overview of a general sensor adapted according to the teachings herein. In the embodiment shown the general sensor 100 is a device having at least one sensor 130 and a long range communications interface, such as a cellular radio communications interface 140. Such a general sensor 100 may be referred to as a User Equipment (UE). In one embodiment the general sensor is comprised in a mobile communications terminal 500, see FIG. 5 and corresponding section below for further details.

Examples of sensors include, but are not limited, to: accelerometer, gyroscope, GPS devices, humidity sensors, temperature sensors, barometer sensors, altitude sensors, magnetic sensors, time sensors, pressure sensors, weight sensors, sound-level sensors, microphone sensors, visual sensors, camera, video-camera, IR-camera, UV-cameras.

For deployment in (remote) areas where cellular coverage is not possible, the long range communication interface may be a satellite-based communication interface.

The general sensor 100 further comprises controller 110, such as a processor for example one or more central processing units (CPUs) or other digital signal processing unit. The controller 110 is operatively connected to a memory, for retrieving instructions from and for storing data on, and to the at least one sensor(s) 130 for controlling the operation of the sensor(s) 130. In one embodiment the controller actively controls the operation of a sensor 130. In one embodiment the controller causes the sensor(s) 130 to operate in a manner as specified by the instructions.

The general sensor 100 comprises the cellular interface 140, being for long range communication, and a short range radio frequency interface 150. The short range interface 150 may be implemented according to one or a combination of at least one of the standards IEEE 802.11 (WiFi), IEEE 802.14.5 (ZigBee for example), Bluetooth®, NFC (Near Field Communication) or other short range (radio frequency) communication interface, RFID (Radio Frequency Identification) and Sigfox. The long range cellular communications interface 140 may be arranged to communicate according to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. The general sensor 100 also comprises at least one antenna 160 which may be external or internal.

The general sensor 100 also comprises a memory 120. The memory 120 may be implemented using any commonly known technology for computer-readable memories such as ROM, RAM, SRAM, DRAM, FLASH, DDR, EEPROM memory, flash memory, hard drive, optical storage or any combination thereof. The memory 120 is used for various purposes by the controller 110, one of them being for storing sensor data and operating instructions for the sensor(s) 130.

The general sensor or UE 100 may optionally comprise a user interface 170 which may comprise a display, a number of light indicators, possibly implemented as LEDs (Light Emitting Diodes), and at least one key. One example of a user interface is described with reference to FIG. 5 which shows a mobile communications terminal 500 comprising a general sensor 100.

Figure 2:
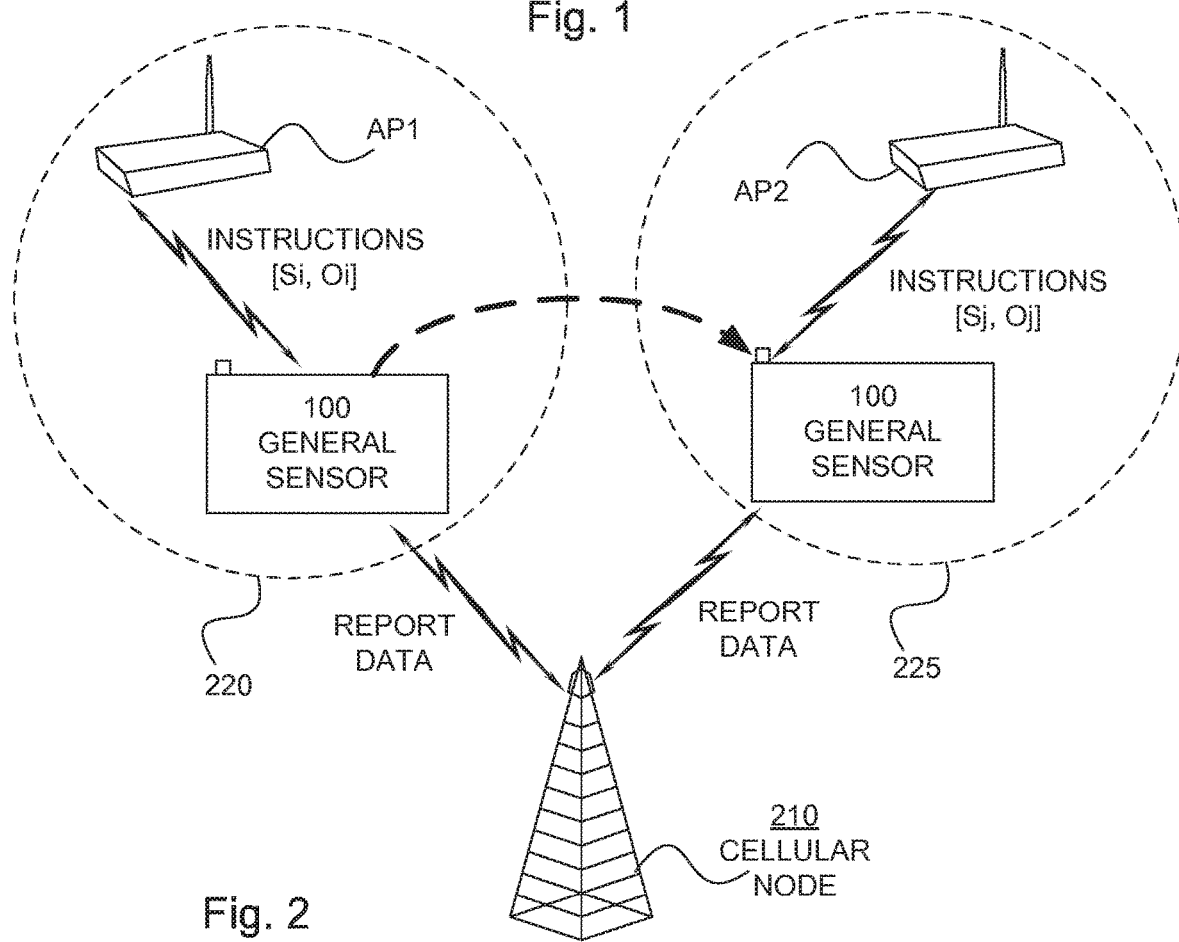
FIG. 2 shows a schematic view of a network comprising a general sensor according to one embodiment of the teachings of this application.

FIG. 2 shows a schematic view of a network in which the general sensor arranged in a general sensor 100 is arranged to be used. The operation of a general sensor will be described below with simultaneous reference to FIG. 2 and to FIG. 3 which shows a schematic overview of the functionality of a general sensor 100.

The general sensor 100 is arranged to detect that a short range communication access point AP1, such as a WiFi access point, is within range for the short range communication interface 150. The range of an access point AP is indicated by the dashed circles in FIG. 2. If the general sensor 100 is in range of the access point AP1, the general sensor 100 is configured to establish a connection with the access point AP1 for receiving operating instructions for the at least one sensor(s) 130. In FIG. 2, the instructions are referenced INSTRUCTIONS [Si, Oi] indicating that a set of instructions may be received comprising separate operating instructions (Oi) for each sensor (Si). The operating instructions may be specific to an individual sensor 130, a sub set of the sensors 130 or all sensors 130.

Figure 3:
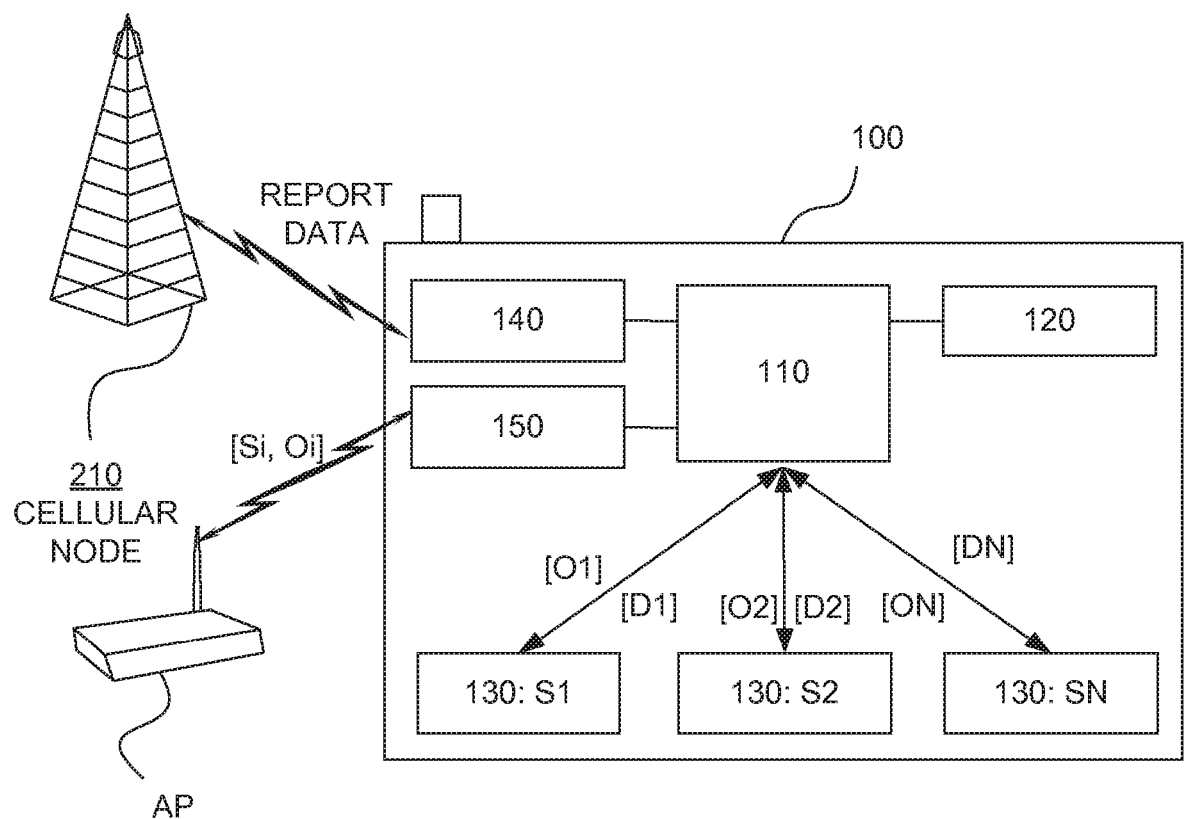
FIG. 3 shows a schematic view of the operation of a general sensor according to one embodiment of the teachings of this application.

As can be seen in FIG. 3, the general sensor operates the at least one sensor 130 according to the received operating instructions [Si, Oi] which has been received from the access point AP. The operating instructions are executed for each associated sensor 130. In the example of FIG. 3, the operating instructions O1 for sensor S1 is provided to sensor S1, the operating instructions O2 for sensor S2 is provided to sensor S2 and the operating instructions ON for sensor SN is provided to sensor SN. The operating instructions may be provided to a sensor by the controller executing the operating instructions thereby controlling the corresponding sensor(s).

Each sensor 130:Si which is activated and controlled by operating instructions Oi generates sensor data. Di.

The sensor data may or may not be further processed by the controller 110 before being forwarded to a server or other data receiver through a cellular communications network via a cellular node 210 through the cellular communication interface 140 for collection and/or (further) processing of the sensor data. Such further processing by the controller may be to transform a sensor reading into a meaningful quantity, such as transforming electrical sensor readings into a corresponding physical value (for example, voltage reading to temperature). The processing may also be more complicated and involve transforming a sensor reading into a derivative.

In FIG. 2 one cellular node 210, such as a base station, is shown, but it should be noted that the cellular node 210 represents a cellular network which consists of several cellular nodes as would be known to a skilled person. Depending on the location of the general sensor 100 different cellular nodes 210 may be communicated with. Also, depending on the radio access technology to be used to transmit the sensor data, different cellular nodes 210 may also be used.

In one embodiment the operating instructions may be updated regularly or based on environmental conditions, changes in such conditions or through other programming. The update may be initiated by the access point pushing new operating instructions to the general sensor. The update may also be initiated by the general sensor 100 prompting or polling the access point for updated operating instructions.

The operating instructions may be provided as a command script, such as a java script, an XML script or other script language or other computer program language, possibly a native machine code. This enables for a complicated and advanced control of the sensor(s). The instructions may also be provided as commands according to an AP1 (Application Programming interface) possibly as a text file that is parsed for extracting the different commands.

The instructions may also be provided as a simple array indication for example specifying a time interval for each sensor indicating how often the corresponding sensor should be read. An example of such an array is [S1, 100, S2, −1; SN, 0] indicating that Sensor S1 should be read every 100 ms, sensor S2 should remain inactive and sensor SN to be read continuously.

This enables for a simple communication protocol to be established between the general sensor 100 and the operating instructions providing access point.

In one embodiment the controller may be configured to transmit sensor data to the access point and in return receive updated operating instructions. This enables the operating instructions to be adapted to current environmental factors and/or sensor readings without having to transmit complicated operating instructions to the general sensor 100. This enables for a simpler implementation in the general sensor 100.

One example to illustrate the different possibilities relates to a situation where a sensor monitors a value that is not allowed to exceed a threshold level TL. Using a complicated script, such as a Java script, the pseudo code below could be implemented in a script and executed by the controller 110.

t:=0//t: time counter
T:=500//T: the time between readings
//TL: Threshold level
//WL: Warning level close to threshold level
Data_value=Read_sensor(Si);
while Data_value<TL do{
  while t<=T dot:=t+1;
  Data_value=Read_sensor(Si);
  if Data_value>=WL then T:=100 else T:=500;
}
Report_Alarm(Data_Value);

This script enables the sensor to be read at fixed intervals as long as the sensor value is well below the threshold level, and as the sensor value approaches the threshold value (that is when it exceeds a warning level), the sensor value is read more frequently. Should the threshold value be exceeded, the data is reported in an alarm.

Using a less complicated instruction format the same function can be implemented by the following instructions sequence:

Oi is received by the controller 110, Oi=[Si, Ti, Vi], where i denotes which sensor, Ti denotes the time intervals and Vi indicates a value level to report.

Vi is reached and this is reported to the access point AP1 which provides new instructions Oi=[Si, Tj, Vj] where Tj<Ti (indicating a more frequent reading) and Vj>Vi (indicating a more severe level).

Using an even simpler instruction format the same functionality may be implemented through the following instructions sequence:

Oi is received by the controller 110, Oi=[Si, where i denotes which sensor, Ti denotes the time intervals. For each sensor reading the read value is reported through the cellular network. As a sensor value reaches the warning level, the cellular network may either respond to the general sensor 100 to change the time intervals between measurements, or instruct the access point to provide such updated operating instructions to the general sensor 100.

As the general sensor 100 carrying the at least one sensor 130 moves out of range of the first access point AP1 it will no longer be able to receive operating instructions from the first access point AP1.

In one embodiment, the controller may then be configured to continue to control the at least one sensors 130 to operate as per the last received operating instructions received from the access point that the connection to has just been lost. The controller 110 may be configured to continue such operation for a specific time period. The time period may have been provided as part of the operating instructions from the access point or may have been provided by a data collector server through the cellular network. The time period may also be specified in the general sensor 100 by being pre-stored in the memory 120. This ensures continued operation even if the access point is unable to function or being blocked.

In one embodiment, the controller may alternatively be configured to resume control of the at least one sensors 130 to operate as per standard operating instructions possibly pre-stored in the memory 120 of the general sensor 100. This enables the general sensor 100 to operate in a general manner unless more specific operating instructions exist, where the condition is based on an availability of the access point, for example through a geographical locality, wherein the context could contain a space locality.

In one embodiment, the controller may alternatively be configured to resume control of the at least one sensors 130 to operate as per operating instructions previously active, before a connection to the access point was established. This enables the general sensor 100 to operate according to different context specific instructions, which instructions are prioritized based on the availability of the corresponding access point, for example through the geographical location of the access point.

In one embodiment, the controller may alternatively be configured to report that the connection with the access point has been lost through the cellular node 210 and receive new operating instructions accordingly.

In one embodiment, the controller may alternatively be configured to control the at least one sensors 130 to remain inactive as long as no new operating instructions are received or, alternatively or additionally, the controller may refrain from reporting any data readings. In one embodiment the controller 110 may refrain from reporting any data readings after a time period has passed from when the connection was lost.

The general sensor 100 is, in one embodiment, configured to continuously scan for other access points. In one embodiment the general sensor 100, is configured to periodically scan for other access points. Returning to the example network of FIG. 2, the general sensor 100 travels from the first access point AP1 towards a second access pint AP2, as indicated by the dashed arrow. As the general sensor 100 leaves the coverage area 220 of the first access point AP1 it may configure its control of the at least one sensor 130 in a manner according to above and continue to or start to scan for other access points. As the general sensor 100 enters the coverage area 225 for the second access point AP2, a connection is established between the general sensor 100 and the second access point AP2 through the short range communication interface 150. The second access point AP2 may then provide the general sensor 100 with its own set of operating instructions [Sj, Oj] specific to the second access point AP2. The controller stores the received operating instructions in the memory 120 and controls the operation of the at least one sensor 130 accordingly in a manner similar to as was described in the above.

The general sensor 100 continues to report the sensor data (or derivates of the sensor data) through the same cellular network. Possibly, the data is reported through an alternative cellular network depending on specific instructions and/or specific data formats. To illustrate with a very simple example, a text file comprising simple sensor data, such as a temperature reading, may be reported in a text message through a GSM network, whereas a more complicated sensor reading, such as an infrared camera image to be analyzed, may be reported in a multimedia message through a UMTS network. In this application it will be assumed that all data reporting is performed through the same cellular network even if a skilled person would realize that variations may be possible.

In some situations the coverage areas of two access points may overlap one another and the controller may then receive operating instructions from two different access points simultaneously.

In one embodiment, the controller 110 is configured to control the at least one sensor 130 according to the last received operating instructions. This enables a last-to-connect-rule to prioritize the sensor control, where the last access point to be connected to specifies the operation of the sensors. This assumes that the last access point to connect to carries the most relative operating instructions being the most recently encountered access point.

In one embodiment, the controller 110 is configured to control the at least one sensor 130 according to the first received operating instructions. This enables a first-to-connect-rule to prioritize the sensor control, where the first access point to be connected to specify the operation of the sensors. This assumes that the first access point to connect to carries the most relative operating instructions while the corresponding access point is still in range.

In one embodiment, the controller 110 is configured to control the at least one sensor 130 according to a priority scheme, where each access point is provided with a priority level and the controller determines which set of operating instructions to be used based on the priority of the corresponding access point. The priorities may be given for the complete set of operating instructions or be individually specified for each sensor. The operating instructions would then be received in the form [Si, Oi, Pi] indicating the operating instructions Oi having priority Pi for sensor S1.

In one embodiment the controller 110 is configured to run both sets of operating instructions in parallel. In one such embodiment the controller 110 is configured to coordinate the operating instructions. Such coordination may be achieved by finding a smallest common time interval. To illustrate with an example, if a first set of instructions O1=[Si, 100] is received from a first access point and a second set of instructions O2=[Si, 500] is received from a second access point, it suffices to run the relevant sensor S1 according to the operating instructions O1 from the first access point as this will also satisfy the requirements behind the second set of operating instructions O2. Running the two instructions in parallel would provide the same result, with a possible double reading at time instances 500.

In one embodiment the operating instructions may be arranged to indicate that they should be run irrespective of previously received operating instructions. This enables for a provider of operating instructions to ensure that operating instructions specific to a special context is indeed executed. This is beneficial in instances where incorrect sensor readings may be harmful to persons or to property.

This enables a configuration of a sensor to operate according to context specific criteria.

The operating context may be spatial, that is specific to a spatial locality (possibly geographical, but also related to a specific company or functional site, such as an industry plant. For example, as a general sensor enters a specific site it may come within range of a site-specific access point and be provided with operating instructions specific to that site.

For example, if truck carrying a liquid to be kept cold arrives at an overnight storage facility, a general sensor belonging to the truck may be configured to more regularly sense the temperature in the load as the risk of the temperature rising is higher when the truck is not moving.

The operating context may be temporal, that is specific to a temporal locality, such as a time or a season. For example, if the same truck is driving on a summer's day, it can be assumed that the temperature is higher than normal and the temperature sensing may be done more frequently to ensure that any temperature change is detected in time. The time may also determine the manner or frequency of reporting the data. For example, for payment schemes for data traffic that utilize a varying bit fee that varies with the time of day, one alternative can be to report data more frequently during those periods when the bit fee is low.

The operating context may be company specific. Different companies may use the same general sensors, but have specific criteria that should be followed. This enables for company policy measurements to be implemented by a general sensor.

The operating context may be regional and relate to regional regulations. This enables a general sensor to be adapted according to regional regulations. For example, a general sensor may be controlled to not report data when being on an airplane by a local access point located in the airport gate as any radio frequency communication would not be allowed during the flight.

The operating context may be operational specific. For example, if it is detected that a truck, such as in the examples above, is no longer moving, the temperature sensor may be configured to more measurements to ensure that a temperature rise is caught in time, as a failure of a cooling system increases if the truck stops unexpectedly, possibly due to a break down.

Returning to the example in the background section of a user downloading an application to register irregularities in a road, the same application may be realized through an in-context configuration of a smartphone. As the smartphone enters a car, it establishes a connection with the cars Bluetooth interface. The smartphone may then be instructed to register bumps and when such are detected to report the bump along with current a position. As the application leaves the car, the measurements are stopped and no false reports are reported based on any physical activities that the user may partake in.

Another example is for a general sensor being carried by a user, that when a building is entered, the general sensor is instructed to measure temperature and location at a certain periodicity. This data is then reported and used to control the heating/cooling of the building where people are actually located.

By enabling a general sensor comprising at least one sensor 130 to receive operating instructions via a short range communication network it is possible to provide the general sensor 100 with operating instructions that are context specific and without any cost to the instructions provider, specially when providing complicated control scripts the data traffic needed to transmit the necessary code segments may be non-negligent.

The use of short range communication interfaces also ensures a more secure connection as such connections are easier to control and maintain as they fall under the control of the instruction provider. It is also possible to provide a more specific position locality for providing an accurate space locality context. The position may be determined in relation to the access point. A short range communication standard having a limited range, such as Bluetooth® may provide a position determination within 10 in of the general sensor. Such accuracy is not possible through cellular position determination methods.

Furthermore, using the access point for determining a locality is beneficial in that the general sensor 100 does not have to continuously update its position and match it against a stored position. Such stored positions would have to have been pre-stored, which is one of the problems that the teachings herein aim to solve. Also, as the access point defines the context-specific location the detection of an AP is—by definition—an exact location determination with regards to an access point.

The use of short range access points also enable for an ad-hoc system to be designed where changes are easy to implement, by simply adding a new access point. Adding an access point will not affect the rest of the network or require any updates with the network, the cellular network or the general sensor. It is thus easy for a user to implement specific sensor control.

By enabling the general sensor 100 to report the data via a cellular network through the cellular communication interface 140 of the general sensor 100, the data may be reported without incurring any costs to the operating instructions provider. This enables a context specific configuration of a general sensor at no cost to the provider of operating instructions. Should the operating instructions provider be required to bare the cost of data reporting it could lead to more complicated business deals having to be made, and also unwillingness to implement a local access point for providing operating instructions.

Another advantage is provided in that the general sensor 100 is not required to continuously poll a server through the cellular network to ensure that up-to-date operating instructions has been received, especially for general sensor 100 being on the move, The manner taught herein may also be used for enabling a local or user-specific configuration of a general sensor device, such as a general sensor 100 comprising at least one sensor 130. A general sensor may thus be manufactured and sold without any specific operating instructions and the operating instructions may be provided at the client side when the general sensor is first taken into use. The general sensor may then be configured exactly according to the user's requirements without incurring any costs or risking divulging trade secrets to the manufacturer or provider of the general sensor.

Figure 4:
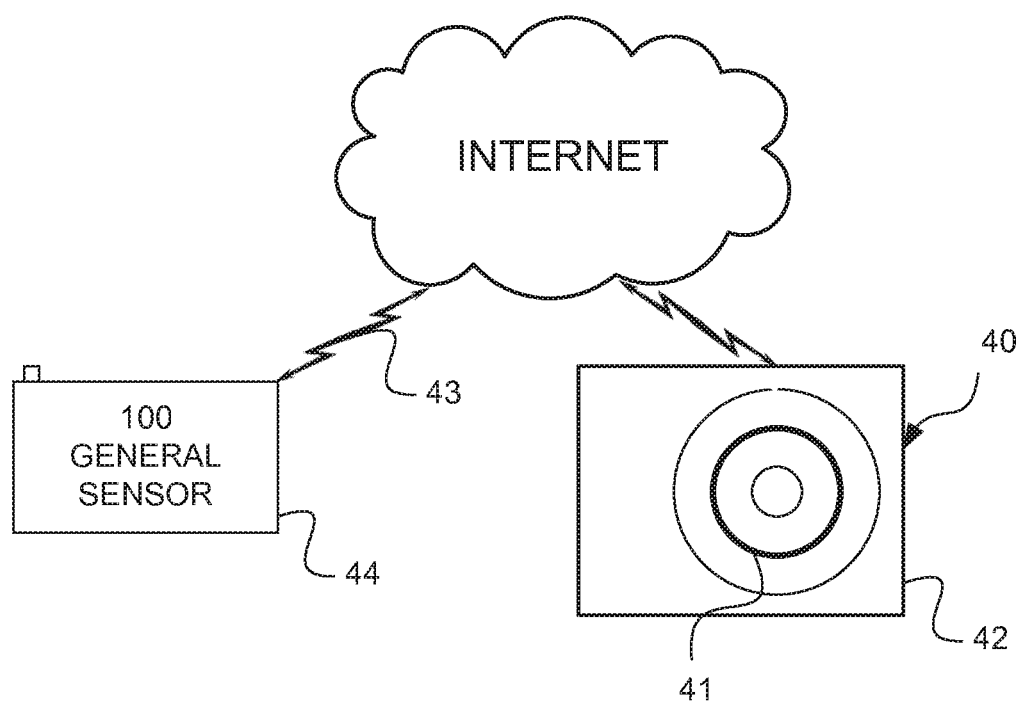
FIG. 4 shows a schematic view of a computer-readable medium according to one embodiment of the teachings of this application.

FIG. 4 shows a schematic view of a computer-readable medium as described in the above. The computer-readable medium 40 is in this embodiment a data disc 40. In one embodiment the data disc 40 is a magnetic data storage disc. The data disc 40 is configured to early instructions 41 that when loaded into a controller, such as a processor, executes a method or procedure according to the embodiments disclosed herein. The data disc 40 is arranged to be connected to or within and read by a reading device 42, for loading the instructions into the controller. One such example of a reading device 42 in combination with one (or several) data disc(s) 40 is a hard drive. It should be noted that the computer-readable medium can also be other mediums such as compact discs, digital video discs, flash memories or other memory technologies commonly used.

The instructions 41 may also be downloaded to a computer data reading device 44, such as a general sensor or other device capable of reading computer coded data on a computer-readable medium, by comprising the instructions 41 in a computer-readable signal 43 which is transmitted via a wireless (or wired) interface (for example via the Internet) to the computer data reading device 44 for loading the instructions 41 into a controller. In such an embodiment the computer-readable signal 43 is one type of a computer-readable medium 40.

The instructions may be stored in a memory (not shown explicitly in FIG. 4, but referenced 120 in FIG. 1) of the general 44 sensor, possibly comprised in a mobile communications terminal such as a smart phone.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 5:
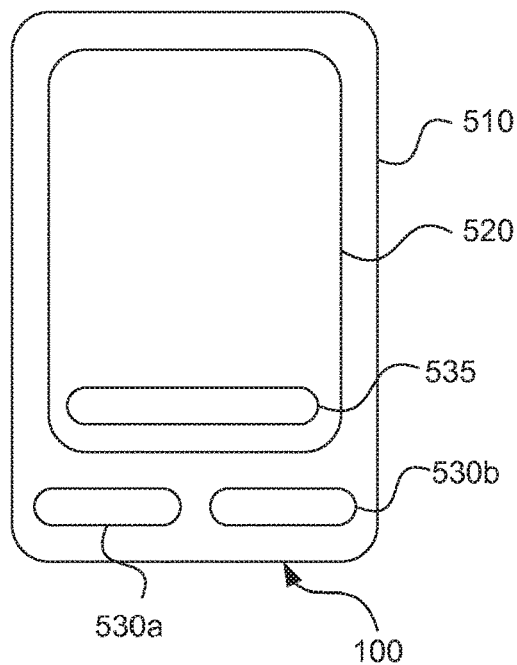
FIG. 5 shows a schematic view of a mobile communications terminal incorporating a general sensor according to an embodiment of the teachings of this application.

FIG. 5 shows a schematic view of an embodiment of a mobile communications terminal 500 comprising a general sensor 100 of FIGS. 1, 2 and 3. The mobile communications terminal 500 comprises at least one sensor 130, as shown in FIGS. 1 and 3, through the general sensor 100. The mobile communications terminal 500 further comprises a housing 510 in which a display 520 is arranged. In one embodiment the display 520 is a non-touch display. In other embodiments the display 520 is a touch display. Furthermore, the mobile phone 100 comprises two hard-wired keys 530. In this embodiment there are two keys 530a and 530b, but any number of keys, including none, is possible and depends on the design of the mobile phone 100. In one embodiment the mobile phone 100 is configured to display and operate a virtual key 535 on the touch display 520. It should be noted that the number of virtual keys 535 are dependent on the design of the mobile communications terminal 500 and an application that is executed on the mobile communications terminal 500.

The mobile communications terminal may share a controller and memory with the general sensor 100 or it may be arranged with its own controller and memory (not shown in FIG. 5).

Figure 6:
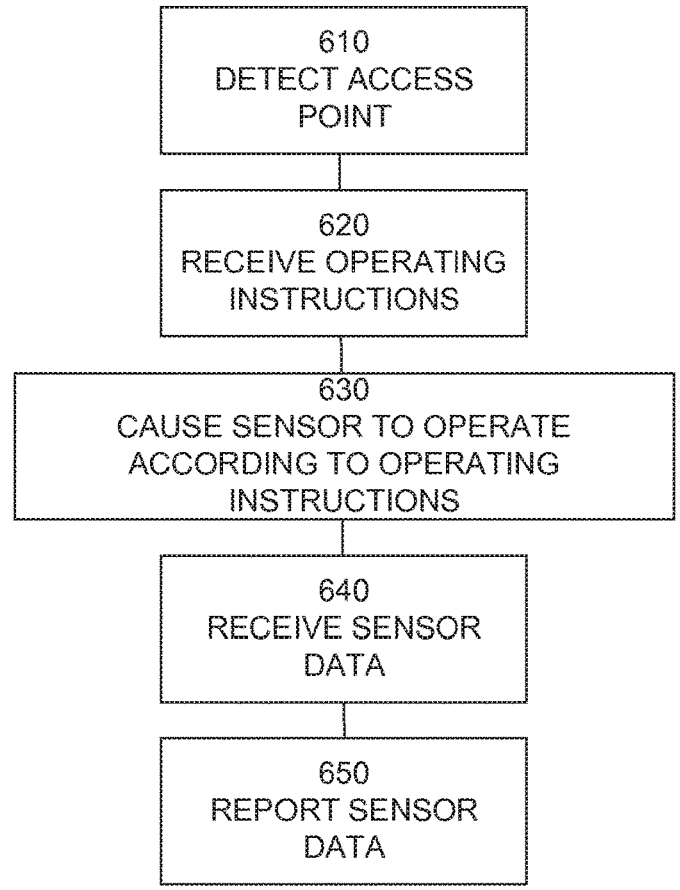
FIG. 6 shows a flow chart for a general method according to an embodiment of the teachings of this application.

FIG. 6 shows a flowchart of a general method according to the teachings herein. A general sensor detects a first access point through a short range communications interface 610. The general sensor receives 620 operating instructions for at least one sensor from said first access point. The general sensor further causes the at least one sensor to operate 630 according to said operating instructions. The general sensors receives 640 sensor data from the at least one sensor and reports 650 the sensor data through a long range communications interface.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A general sensor comprising:
at least one sensor;
a short range communications interface;
a long range communications interface; and
a controller,
wherein said controller is configured for:
detecting a first access point through said short range communications interface;
receiving operating instructions for said at least one sensor from said first access point;
causing said at least one sensor to operate according to said operating instructions;
receiving sensor data from said at least one sensor; and for
reporting said sensor data through said long range communications interface.

2. The general sensor according to claim 1, wherein said controller is further configured for:
detecting a second access point through said short range communications interface;
receiving operating instructions for said at least one sensor from said second access point; and
determining whether at least one of said at least one sensors should operate according to said operating instructions, and, if so, causing said least one of said at least one sensor to operate according to said operating instructions.

3. The general sensor according to claim 2, wherein said controller is further configured for determining whether to receive operating instructions from said second access point based on a priority scheme for said first access point and said second access point.

4. The general sensor according to claim 1, wherein said controller is further configured for detecting that a connection with said first access point is not available through said short range communications interface and, in response thereto, refraining from reporting said sensor data through said long range communications interface.

5. The general sensor according to claim 4, wherein said controller is further configured for determining that a threshold time since the detection that the connection is not available has passed and then refraining from reporting said sensor data through said long range communications interface.

6. The general sensor according to claim 1, wherein said controller is further configured for detecting that a connection with said first access point is not available through said short range communications interface and, in response thereto, control the operation of said at least one sensor according to previously received operating instructions.

7. The general sensor according to claim 6, wherein said previously received operating instructions are stored in a memory comprised in said general sensor.

8. The general sensor according to claim 1, wherein said controller is further configured for processing said sensor data before reporting said sensor data.

9. The general sensor according to claim 1, wherein said controller is further configured for reporting sensor data to said first access point and in response thereto receive updated operating instructions.

10. The general sensor according to claim 1, wherein at least a part of said operating instructions are specific to one of said at least one sensor.

11. The general sensor according to claim 1, wherein said operating instructions are arranged to specify that at least one of said at least one sensor is to remain inactive.

12. The general sensor according to claim 1, wherein said operating instructions are based on an operating context, wherein said operating context is taken from a group comprising spatial locality, temporal locality, company policy, regional regulations, and seasonal aspects.

13. The general sensor according to claim 1, wherein said long range communications interface is a cellular communications interface.

14. The general sensor according to claim 1, wherein said short range communications interface is arranged to operate according to a standard taken from a group of standards comprising: Bluetooth®, Near Field Communication (NFC), a WLAN-associated technology standard, Radio Frequency Identification (RFID) or Sigfox.

15. A Mobile communications terminal comprising the general sensor according to claim 1.

16. The mobile communications terminal according to claim 15, wherein said mobile communications terminal is a mobile telephone or an internet tablet.

17. A method for use in a general sensor comprising at least one sensor, a short range communications interface, a long range communications interface, said method comprising:
   detecting a first access point through said short range communications interface;
   receiving operating instructions for said at least one sensor from said first access point;
   causing said at least one sensor to operate according to said operating instructions;
   receiving sensor data from said at least one sensor; and
   reporting said sensor data through said long range communications interface.

18. A nontransitory computer readable storage medium encoded with instructions that, when loaded and executed on a processor, causes the processor to perform a method for use in a general sensor comprising at least one sensor, a short range communications interface, and a long range communications interface, said method comprising:
   detecting a first access point through said short range communications interface;
   receiving operating instructions for said at least one sensor from said first access point;
   causing said at least one sensor to operate according to said operating instructions;
   receiving sensor data from said at least one sensor; and
   reporting said sensor data through said long range communications interface.

* * * * *

UNITED STATES PATENT AND TRADEMARK OFFICE
CERTIFICATE OF CORRECTION

| | | |
|---|---|---|
| PATENT NO. | : 10,757,646 B2 | Page 1 of 3 |
| APPLICATION NO. | : 16/805728 | |
| DATED | : August 25, 2020 | |
| INVENTOR(S) | : Lindoff et al. | |

It is certified that error appears in the above-identified patent and that said Letters Patent is hereby corrected as shown below:

On the Title Page

Item (72), in Column 1, Line 1, delete "Bjarred, (SE);" and insert -- Bjärred, (SE); --, therefor.

On Page 2, item (56), under "OTHER PUBLICATIONS", in Column 2, Line 4, delete "Ohinese" and insert -- Chinese --, therefor.

In the Drawings

In Fig. 5, Sheet 3 of 3, insert Main Designator -- 500 --.

In the Specification

In Column 1, Line 8, delete "16/601,700," and insert -- 16/601,700 (now U.S. Pat. No. 10,609,637) --, therefor.

In Column 1, Line 65, delete "a. position" and insert -- a position --, therefor.

In Column 1, Lines 65-66, delete "what so ever" and insert -- whatsoever --, therefor.

In Column 2, Line 37, delete "no cots" and insert -- no costs --, therefor.

In Column 2, Line 37, delete "i.e," and insert -- i.e., --, therefor.

In Column 3, Line 3, delete "WIN" and insert -- WiFi --, therefor.

In Column 3, Line 29, delete "to bare" and insert -- to bear --, therefor.

In Column 5, Line 7, delete "access point AP" and insert -- access point AP1 --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,757,646 B2

In Column 5, Line 17, delete "sub set" and insert -- subset --, therefor.

In Column 5, Line 21, delete "[Si, Oil" and insert -- [Si, Oi] --, therefor.

In Column 5, Lines 21-22, delete "access point AP." and insert -- access point AP1. --, therefor.

In Column 5, Line 32, delete "data. Di." and insert -- data Di. --, therefor.

In Column 5, Lines 65-66, delete "AP1 (Application Programming interface)" and insert -- API (Application Programming Interface) --, therefor.

In Column 6, Line 30, delete "while t<=T dot:=t+1;" and insert -- while t<=T do t:=t+1; --, therefor.

In Column 6, Line 34, delete "Report_Alarm(Data_Value);" and insert
-- Report_Alarm(Data_Value). --, therefor.

In Column 6, Line 54, delete "Oi=[Si," and insert -- Oi=[Si, Ti], --, therefor.

In Column 7, Line 46, delete "access pint AP2," and insert -- access point AP2, --, therefor.

In Column 7, Line 63, delete "derivates" and insert -- derivatives --, therefor.

In Column 8, Line 17, delete "to specifies" and insert -- to specify --, therefor.

In Column 8, Line 38, delete "sensor S1." and insert -- sensor Si. --, therefor.

In Column 8, Line 47, delete "sensor S1" and insert -- sensor Si --, therefor.

In Column 8, Line 63, delete "(possibly" and insert -- possibly --, therefor.

In Column 9, Line 34, delete "unexpectantly," and insert -- unexpectedly, --, therefor.

In Column 9, Line 43, delete "with current a position." and insert -- with a current position. --, therefor.

In Column 10, Line 2, delete "10 in" and insert -- 10 m --, therefor.

In Column 10, Line 28, delete "to bare" and insert -- to bear --, therefor.

In Column 10, Line 36, delete "move," and insert -- move. --, therefor.

In Column 10, Line 50, delete "is in this embodiment a data disc 40." and insert -- in this embodiment is a data disc 40. --, therefor.

CERTIFICATE OF CORRECTION (continued)
U.S. Pat. No. 10,757,646 B2

In Column 10, Line 52, delete "early" and insert -- carry --, therefor.

In Column 11, Line 8, delete "general 44 sensor," and insert -- general sensor 44, --, therefor.